Figure 1:
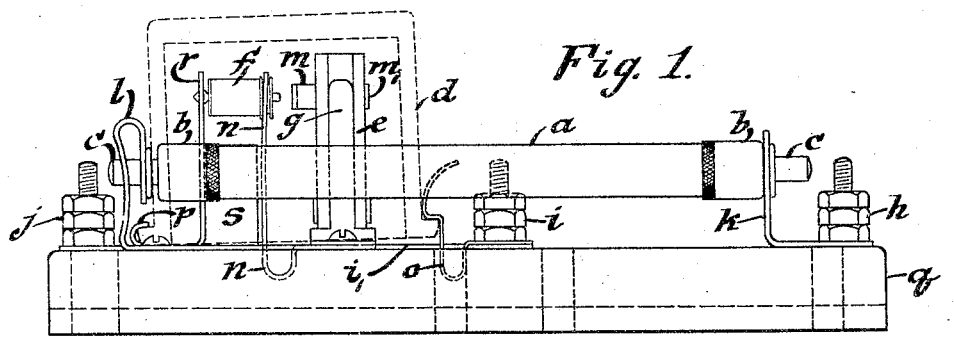

No. 774,158. PATENTED NOV. 8, 1904.
F. B. COOK.
PROTECTIVE DEVICE FOR ELECTRICAL CIRCUITS.
APPLICATION FILED NOV. 13, 1903.
NO MODEL.

Witnesses:
Fred R. Parker.
Harry B. Elmers.

Inventor:
Frank B. Cook.

No. 774,158.                                              Patented November 8, 1904.

UNITED STATES PATENT OFFICE.

FRANK B. COOK, OF CHICAGO, ILLINOIS.

PROTECTIVE DEVICE FOR ELECTRICAL CIRCUITS.

SPECIFICATION forming part of Letters Patent No. 774,158, dated November 8, 1904.

Application filed November 13, 1903. Serial No. 181,011. (No model.)

*To all whom it may concern:*

Be it known that I, FRANK B. COOK, a citizen of the United States, residing at Chicago, in the county of Cook and State of Illinois, have invented new and useful Improvements in Protective Devices for Electrical Circuits, of which the following is a full, clear, concise, and exact description, reference being had to the accompanying drawings, forming a part of this specification.

My invention relates to a combination of protective devices, my object being to provide a compact and accessible arrangement of such devices by which an electrical circuit may be protected from strong currents, sneak currents, and high-voltage currents, such as lightning, the said arrangement being adapted for use in various circuits and under various conditions.

Generally protective devices are used which protect electrical circuits against one or two forms of electric currents—as large currents, small currents, or high-voltage currents, such as lightning; but it is very essential to protect certain instruments and electrical apparatus from all of these different forms of currents at the same time. The necessity of such protection has led me to devise an arrangement for this purpose, such as will be hereinafter described.

One form of instruments, especially, which needs protection from all forms of electric currents not employed for operating the instrument is the telephone at the subscriber's substation, and I have adapted the arrangement of this present invention more particularly for this purpose, it being of a convenient form and size for use in this connection.

The fuse which I preferably employ in this invention is the tubular fuse described and claimed in my application for patent on fuses, filed November 4, 1903, Serial No. 179,799. The heat-coil preferably used is described and claimed in my application for patent on heat-coils, filed November 7, 1903, Serial No. 180,200. While I have used these particular forms of fuse and heat-coil, it is not essential that they should be used, and I therefore desire it to be understood that other forms of such apparatus may be used with good results.

I am aware that lightning-arresters, fuses, and heat-coils of the types described in this invention have been in use. I therefore do not claim such apparatus in detail in this invention, but claim the combination of such parts as will be hereinafter described.

I have illustrated my invention in the accompanying drawings, in which—

Figure 2:
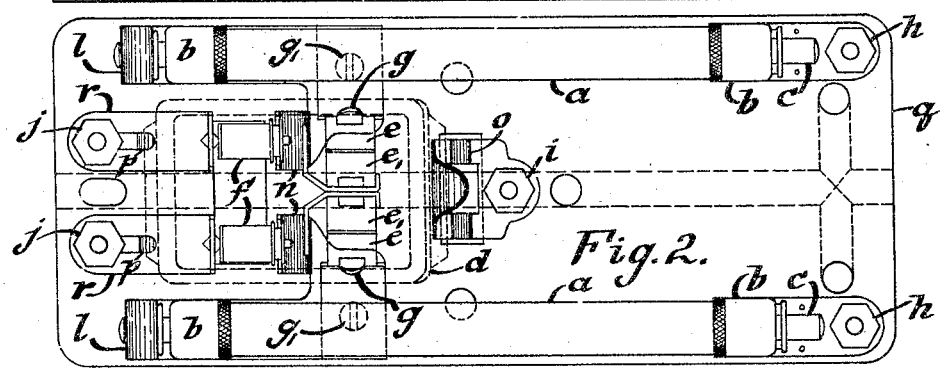
Figures 3, 4:
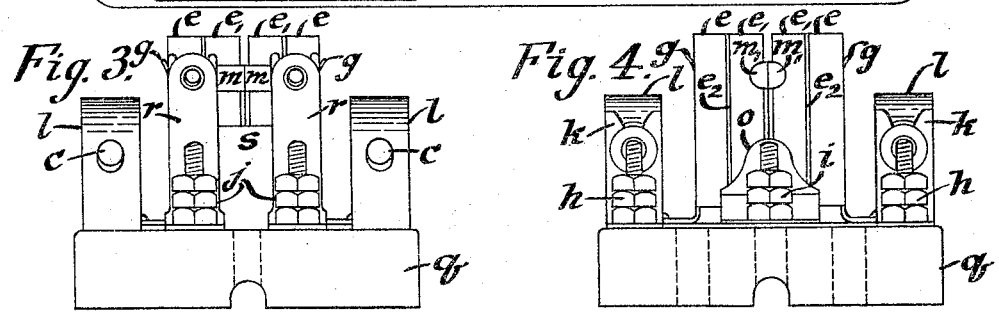
Figures 5, 6:
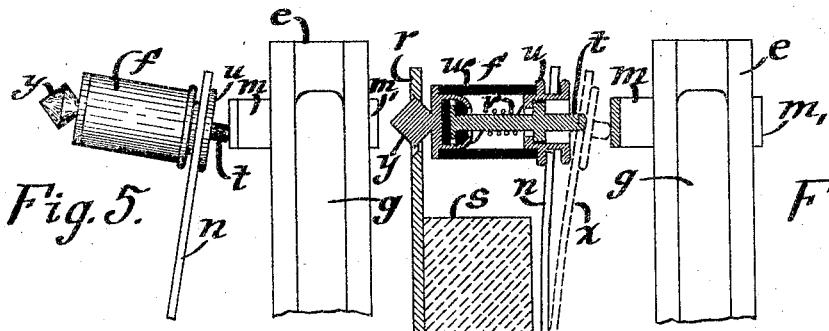

Figure 1 is a side elevation of the protective devices mounted upon a suitable base. Fig. 2 is a top view of Fig. 1, showing a pair of protective devices for a metallic circuit mounted side by side. Fig. 3 is a left end view of Figs. 1 and 2 with the glass cover removed. Fig. 4 is a right end view of Figs. 1 and 2 with the glass cover removed. Fig. 5 is a view of the heat-coil preferably used, showing the said coil in an operated position relatively to the lightning-arrester; and Fig. 6 is a cross-sectional view of the heat-coil and its closely-related parts, taken on a plane including the axis of the coil.

Like characters refer to like parts in the several figures.

This invention consists, essentially, of fuses $a\ a$, heat-coils $f\ f$, and lightning-arresters $e\ e'\ e\ e'$, with their proper connections, mounted on a suitable base $q$ of insulating material. The base $q$ is preferably of porcelain. I will describe one of the pair of protective devices in detail, the other being similar and having like characters for indicating like parts.

The fuse $a$ is provided at its ends with metal caps $b\ b$, which are provided with respective spindles $c\ c$. The spindles $c\ c$ are longitudinally bored for receiving the fuse-wire inclosed in $a$. One spindle $c$ is engaged with spring $l$, a bent spring, as shown in Fig. 1, it being inserted through two holes in $l$. The other spindle $c$ is engaged with spring $k$, it being inserted in a slot in $k$. Springs $l$ and $k$ are secured to base $q$, spring $k$ being secured thereto by binding-post $h$. When fuse $a$ is put in place, one spindle $c$ thereof is inserted through the holes in spring $l$, and then the other spindle $c$ thereof is depressed into the slot in spring $k$. When the fuse is thus depressed, it exerts a torsional stress on spring *l*, this torsional stress giving an end thrust to the fuse, and thereby securing it to spring *k* and making good contacts between springs *l* and *k* and their respective end caps *b b*. Spring *k* also secures its end cap *b* thereto by gripping the spindle *c* in the slot in spring *k*.

The lightning-arrester consists of two carbon blocks *e e'*, with a thin dielectric interposed therebetween, the whole being slipped between spring *g* and ground-plate *m*. The said dielectric is usually provided with small holes, through which a high-potential charge of electricity passes from one carbon block to the other. Spring *g* is secured to spring *l*, preferably by a bolt *g'*. Ground-plate *m* is connected to binding-post *i* through conductor *i'*.

Heat-coil *f* is secured to springs *r* and *n*. (Best shown in Fig. 6.) Spring *n* is provided with a slot in which is inserted the flange *u* of the heat-coil. Spring *r* is provided with a beveled hole therein to receive the conical-shaped lug *y* of the heat-coil. The flange *u* is centrally bored for receiving the core *t* of the heat-coil. The winding *v* is wound on core *t*. Core *t* is conductively secured to flange *u* by a fusible solder and insulated from lug *y*, as shown. The heat-coil winding is inclosed by the insulating-sleeve *w*. Spring *r* is secured to binding-post *j*. Spring *n* is preferably a part of spring *l*, as shown in Fig. 2. When the heat-coil *f* is put in place, the flange *u* is first inserted in the slot in spring *n* and then the lug *y* is depressed and inserted through the hole in spring *r*, as shown in Fig. 6. Depressing the heat-coil in position puts a tension in spring *n*, and when the lug *y* is released from spring *r*, spring *n* consequently takes the position *x*, shown in dotted lines in Fig. 6 or more clearly in Fig. 5.

When an abnormally strong current traverses the winding *v* of the heat-coil, it heats the core *t* thereof, and this heat is conducted to the fusible solder, holding the core *t* to the flange *u*. When the heat is sufficient, the fusible solder softens and allows the core *t* to move in the flange *u*. This allows the lug *y* to drop down in the hole in spring *r* and the tension in spring *n* to decrease. When the pressure between lug *y* and spring *r* is thus sufficiently reduced, the lug *y* is released from spring *r*, and the heat-coil *f* and spring *n* take the position shown in Fig. 5. In this new position core *t* makes contact with ground-plate *m*, which restores the core *t* to its normal relative position in flange *u* before the fusible solder cools. When the solder cools and hardens, it again secures core *t* to flange *u*, as originally, and the heat-coil is then ready to be restored to its normal position. The operation of the heat-coil opens the circuit between springs *r* and *n* and closes the circuit between spring *n* and ground-plate *m*.

The base *q* is properly bored and grooved to receive the connecting-wires. Binding-post *h* is for the line-wire, binding-post *j* is for the instrument-wire, and binding-post *i* is for the ground-wire.

The lightning-arresters *e e' e e'* and heat-coils *f f* are inclosed in a glass cover *d*, held in place by hooks *p p* and spring *o*, as shown in Figs. 1 and 2. Spring *o* is secured to binding-post *i*.

While I have specifically described a single combination of protective devices, I desire it to be understood that this invention includes both the single and double combinations of devices, as shown in Fig. 2 of the drawings.

I do not wish to limit this invention to the minor details of construction as herein shown, as such details do not materially affect the general arrangement of the apparatus.

Having described my invention, what I claim as new, and desire to secure by Letters Patent, is—

1. In a device of the character described, a suitable base for mounting apparatus thereon, a fuse provided with conducting end portions, spring members mounted upon the said base and adapted to engage the said end portions of the fuse and thereby automatically clamp the latter in a circuit, a thermal protector, spring members mounted upon the said base and adapted to hold the thermal protector therebetween and in circuit with the said fuse, and a lightning-arrester suitably mounted upon the said base and provided with a ground-plate adjacent to the thermal protector, the latter grounding the said circuit by means of the ground-plate when operated, substantially as described.

2. In a device of the character described, a suitable base for mounting apparatus thereon, fuses, each provided with conducting end portions, spring members for each fuse, mounted upon the said base and adapted to engage the said end portions of the fuse and thereby automatically clamp the latter in place, thermal protectors, spring members, for each thermal protector, mounted upon the said base and adapted to hold the thermal protector therebetween, the said thermal protectors being in circuit with the respective fuses, lightning-arresters suitably mounted upon the said base and provided with a common ground-plate adjacent to the thermal protectors, the latter being adapted to ground the respective said circuits by means of the ground-plate, when operated, and a suitable cover for the thermal protectors and lightning-arresters, substantially as described.

3. Protective apparatus for electrical circuits, comprising a horizontal base, a tubular fuse, spring members adapted to mount the said fuse horizontally upon the said base, one of the said spring members exerting a torsion on a portion of the fuse, a thermal protector, spring members adapted to mount the thermal protector alongside of the fuse, upon the said base, a lightning-arrester mounted vertically upon the said base and adjacent to the thermal protector, the operation of the latter opening the circuit through same and grounding a portion thereof against the ground-terminal of the lightning-arrester, substantially as described.

4. Protective apparatus for electrical circuits, comprising a horizontal base, tubular fuses, spring members for each fuse and adapted to mount the latter horizontally upon the said base, one spring member for each fuse exerting a torsion on a portion of the latter, thermal protectors, spring members adapted to mount the thermal protectors between the said fuses, upon the said base, lightning-arresters mounted vertically upon the said base and adjacent to the respective thermal protectors, the operation of the latter opening the respective circuits through same and grounding a portion thereof against the ground-plate of the lightning-arresters, and a cover for the thermal protectors and lightning-arresters, suitably held to the said base, substantially as described.

5. In combination, as a protective device for an electrical circuit, a tubular fuse provided with end connecting-lugs, connecting-springs for the said fuse and adapted to engage the respective lugs, one in two holes and the other in a slot, the said springs being arranged so as to clamp the fuse in position, a heat-coil provided with suitable terminals, springs for engaging the respective terminals of the heat-coil, one of the said springs being under a tension when the heat-coil is in place, a carbon lightning-arrester provided with a connecting-spring and a ground-plate, means operated by the heat-coil, whereby one spring thereof is connected with the ground-plate, when the coil operates, suitable connection-terminals for the fuse, heat-coil and lightning-arrester, a suitable insulating-base, provided with holes and grooves therein for receiving the circuit-conductors, upon which the whole is mounted, and means for connecting the fuse, heat-coil and lightning-arrester as a combination protective device for an electrical circuit, substantially as described.

6. In combination as a protective device for electrical circuits, tubular fuses, each provided with end connecting-lugs, connecting-springs for the said fuses and adapted to engage the respective lugs, one, of each fuse, in two holes, and the other, of each fuse, in a slot, the said springs being arranged so as to clamp the respective fuses in position, heat-coils provided with suitable terminals, springs for engaging the respective terminals of the heat-coils, one of the said springs of each coil being under a tension when the heat-coils are in place, carbon lightning-arresters provided with respective connecting-springs and a ground-plate, means operated by the heat-coils, whereby one spring of each coil is connected with the ground-plate, when the respective coils operate, suitable connection-terminals for the fuses, heat-coils and lightning-arresters, a suitable insulating-base, provided with suitable holes and grooves therein for receiving the circuit-conductors, upon which the whole is mounted, and means for connecting the fuses, heat-coils and lightning-arresters as duplicate, combination, protective devices for electrical circuits, substantially as described.

7. In a protective device for electrical circuits, the combination of a tubular fuse provided with end conducting-terminals, springs for engaging the respective end terminals and adapted to clamp the said fuse to the said springs, a heat-coil, provided with a lug on one end and an annularly-grooved member on the other, a spring provided with a hole therein and adapted to receive the said lug, a second spring provided with a slot therein and adapted to receive the said grooved member, a ligntning-arrester provided with a connecting-spring and a ground-plate, means whereby when an abnormally strong current traverses the heat-coil, the said lug is released from the spring engaged therewith, the said annularly-grooved member being connected with the ground-plate, suitable connection-terminals for the fuse, heat-coil, lightning-arrester and ground-plate, a suitable base upon which the whole is mounted, and means for connecting the fuse, heat-coil and lightning-arrester as a combination protective device for an electrical circuit, substantially as described.

8. In a protective device for electrical circuits, the combination of two tubular fuses, each provided with end conducting-terminals, springs for engaging the respective end terminals and adapted to clamp the said fuses to their respective springs, two heat-coils, each provided with a lug at one end, and an annularly-grooved member at the other, a spring for each coil, provided with a hole therein and adapted to receive the said lug, a second spring for each coil, provided with a slot therein and adapted to receive the said grooved member, two lightning-arresters provided with respective connecting-springs and a common ground-plate, means whereby, when an abnormally strong current traverses the heat-coils, the said lugs of the heat-coils are released from their respective springs, thus allowing the said annularly-grooved members to be connected with the ground-plate, suitable connection-terminals for the fuses, heat-coils, lightning-arresters and ground-plate, a suitable base upon which the whole is mounted, and means for connecting the fuses, heat-coils and lightning-arresters as a duplicate set of combination, protective devices for a metallic, electrical circuit, substantially as described.

9. In a protective device for electrical circuits, the combination of two parallel fuses mounted side by side on an insulating-base, two heat-coils arranged side by side between the said fuses, two lightning-arresters arranged side by side, between the said fuses and at one end of the said heat-coils, suitable connection-terminals for the fuses, heat-coils and lightning-arresters, all mounted on the said base, a glass case inclosing the heat-coils and lightning-arresters, a spring-catch mounted on the said base and adapted to secure the glass case to the said base, and means whereby the whole may be connected as a duplicate set of protective devices, substantially as described.

10. In a protective device for electrical circuits, the combination of a horizontal, porcelain base, properly bored and grooved for receiving circuit-conductors, two horizontal, tubular fuses arranged parallel to each other, two heat-coils arranged parallel to each other and between the said fuses, two vertical lightning-arresters arranged parallel to each other, between the said fuses and at one end of the respective heat-coils, the said lightning-arresters having a common ground-plate, suitable springs and connection-terminals for the fuses, heat-coils, lightning-arresters and ground-plate, the said springs and connection-terminals being mounted on the porcelain base, a glass case inclosing the heat-coils and lightning-arresters, suitable catch-springs and lugs mounted on the said base and adapted to hold the glass case in position, and means for connecting the said fuses, heat-coils and lightning-arresters as a duplicate set of combination, protective devices, substantially as described.

In witness whereof I hereunto subscribe my name this 11th day of November, A. D. 1903.

FRANK B. COOK.

Witnesses:
FRED R. PARKER,
HARRY B. ELMERS.